C. ROTHMEYER.
LOADER MAGAZINE FRAME FOR PHOTOGRAPHIC CAMERAS.
APPLICATION FILED NOV. 9, 1918.
1,395,360.
Patented Nov. 1, 1921.
2 SHEETS—SHEET 1.
Fig.1.
Fig.2.
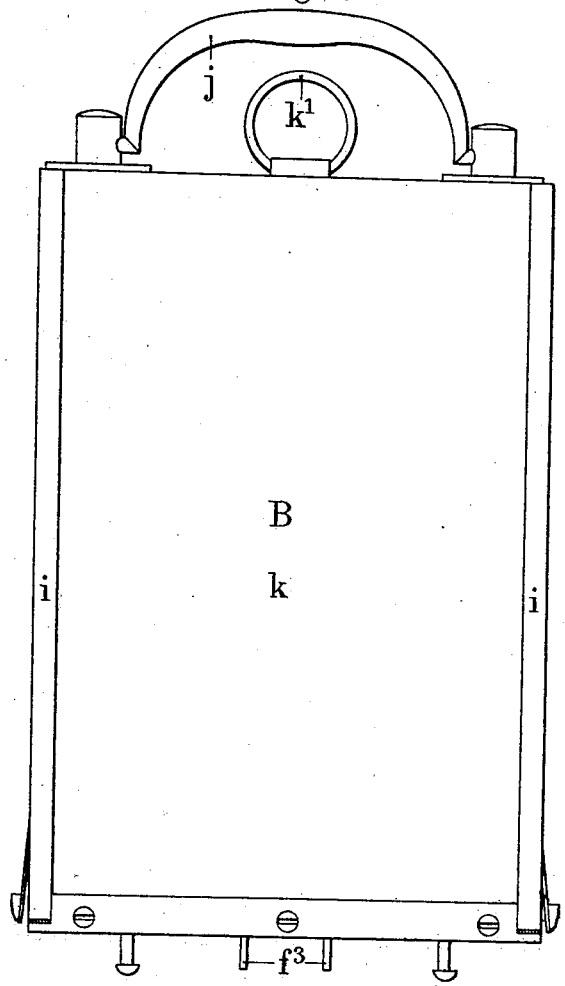
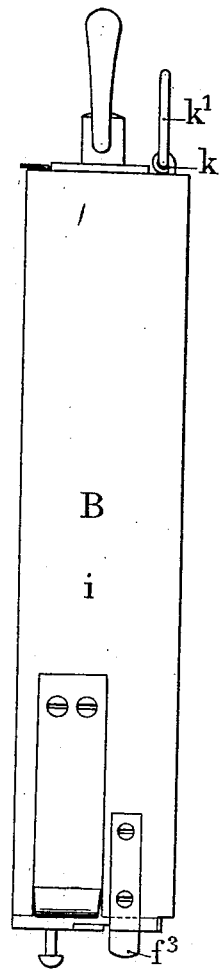
Inventor:
Charles Rothmeyer.
per H. W. Rucker
Attorney.

C. ROTHMEYER.
LOADER MAGAZINE FRAME FOR PHOTOGRAPHIC CAMERAS.
APPLICATION FILED NOV. 9, 1918.

1,395,360.

Patented Nov. 1, 1921.
2 SHEETS—SHEET 2.

Inventor:
Charles Rothmeyer
per H. W. Plucker
Attorney.

UNITED STATES PATENT OFFICE.

CHARLES ROTHMEYER, OF AULNAY-SOUS-BOIS, FRANCE.

LOADER-MAGAZINE FRAME FOR PHOTOGRAPHIC CAMERAS.

1,395,360.   Specification of Letters Patent.   Patented Nov. 1, 1921.

Application filed November 9, 1918. Serial No. 261,881.

*To all whom it may concern:*

Be it known that I, CHARLES ROTHMEYER, of 23 Boulevard du Canal, in Aulnay-sous-Bois, Seine-et-Oise, France, have invented a Loader-Magazine Frame for Photographic Cameras, of which the following is a clear, full, and exact description.

This invention relates to plate holding slides for magazine cameras.

The slide according to the present invention is chiefly intended for use in daylight loading magazine cameras for transporting unexposed plates incased in metallic sheaths from a loading device into the camera and for bringing said plates back again from the latter to the loading device after exposure in the camera. The loading device does not form part of this invention.

By way of example, a slide according to this invention will be described hereunder with reference to the accompanying drawing, in which:

Figure 1 shows the slide in elevation with its bottom closure and shutter in place.

Fig. 2 is a side view of the slide.

The slide B consists of a frame $i$, open at the front and provided in addition with another opening at the bottom thereof. A handle $j$ is provided at the upper end of the slide. The front aperture is adapted to be closed by means of a sliding shutter $k$ surmounted by a draw-ring $k'$ as shown in Fig. 1, while the second opening is adapted to be closed by a bottom closure $f$.

On the panel opposite to the shutter $k$, inside the slide and at the side thereof, plate-pressing members are arranged consisting of arms $l$ pivoted at $l'$ and extended forwardly by means of springs $m$. These plate-pressing members serve to insure the plates $e$, which are inclosed in the ordinary sheet-iron frames, passing out of the slide, after the sliding shutter $k$ is raised.

A sliding member $n$, provided at its upper end with an extension $n^2$ by which the member can be operated by hand, is provided with lateral extensions $n'$ which, when the sliding member is drawn upwardly, slide on to the arms $l$ and compress them against the action of their springs $m$ to a plane parallel, or approximately so, to the rear panel of the slide.

The sliding member $n$ is guided in its rectilinear displacements by screws $o$ engaged in slots $n^*$ formed in the aforesaid sliding member.

Figure 3:
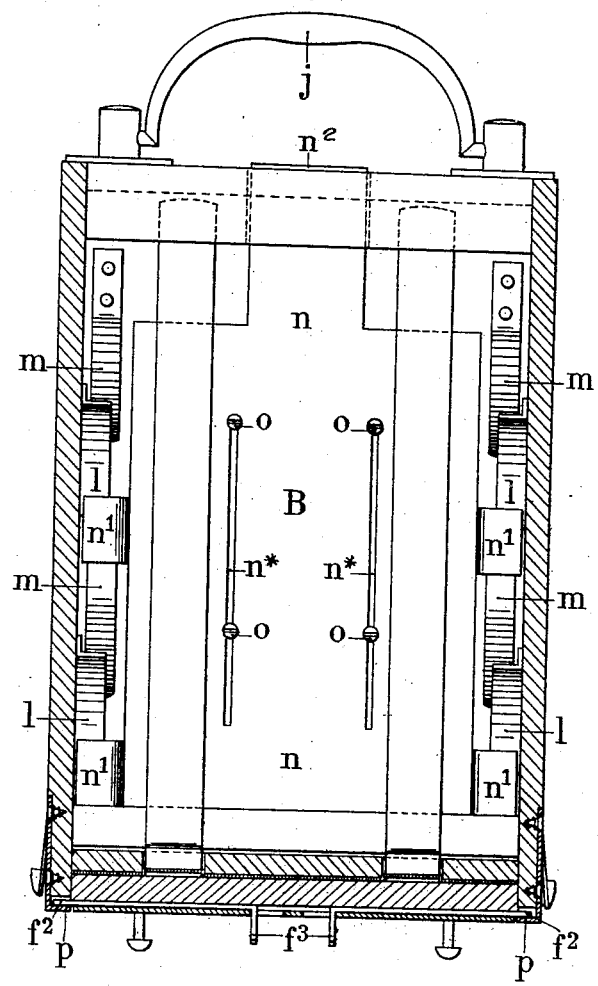
Fig. 3 is a sectional elevation of the said slide.
Figure 4:
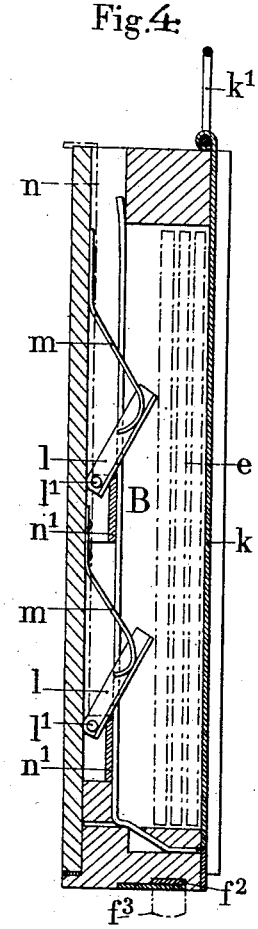
Fig. 4 shows a longitudinal section of the same slide.

The opening in the bottom of the slide B is closed by the bottom closure $f$, which may be fixed when occasion arises on to the bottom of the slide by means of two locking lugs $f^2$ operated by projections $f^3$ and which then come into engagement behind catches $p$ with the slide (see Fig. 3).

When loading the slide with plates, the arms $l$ are rendered inactive by suitably manipulating the member $n$ whereupon the plates in their metal sheaths can be introduced at the front of the slide after withdrawing the shutter $k$.

After the slide is loaded and the shutter $k$ replaced, the member $n$ is operated to release the arms $l$ which are then pressed by the springs $m$ against the plates and tend to advance the front plate into the focal plane of the camera when the slide is in operative position in the latter and the shutter $k$ raised to permit the first photograph to be taken.

I claim:

1. A plate holding slide for magazine cameras, comprising a frame open in front, a sliding shutter adapted to close the front opening in said frame, spring actuated means adapted to press photographic plates contained in the slide toward the front opening, and means for disabling said spring actuated means.

2. A plate holding slide for magazine cameras comprising a frame open in front, a sliding shutter adapted to close the front opening in said frame, two arms pivoted to said frame, springs adapted to press the arms against photographic plates contained in the slide, and a member sliding in said frame having lateral extensions adapted to retract said arms against the pressure of the springs from the plates.

3. A plate holding slide as in claim 1, having an opening in the bottom of the frame and a removable closure for said bottom opening.

4. A plate holding slide as claimed in claim 2, having an opening in the bottom of the frame and a removable closure for said bottom opening.

5. A plate holding slide as in claim 3, having locking lugs on the closure and catches on the frame adapted to engage the locking lugs.

6. A plate holding slide as in claim 4 comprising locking lugs on the bottom closure and catches on the frame adapted to engage said lugs.

The foregoing specification of my loader magazine frame for photographic cameras, signed by me this 18th day of October, 1918.

CHARLES ROTHMEYER.